(12) United States Patent
Barnardo

(10) Patent No.: US 6,360,954 B1
(45) Date of Patent: Mar. 26, 2002

(54) PORTABLE CARDS

(75) Inventor: Christopher J. A. Barnardo, Cambridge (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 09/553,450

(22) Filed: Apr. 19, 2000

Related U.S. Application Data

(63) Continuation of application No. PCT/GB98/03145, filed on Oct. 22, 1998.

(30) Foreign Application Priority Data

Oct. 22, 1997 (EP) .............................................. 97308410

(51) Int. Cl.[7] .............................................. G06K 19/06
(52) U.S. Cl. ...................... 235/492; 235/487; 235/488
(58) Field of Search ................................. 235/492, 486, 235/487, 488, 380

(56) References Cited

U.S. PATENT DOCUMENTS

| | | | | |
|---|---|---|---|---|
| 3,688,088 A | * | 8/1972 | Brown et al. ................. | 235/492 |
| 4,614,861 A | * | 9/1986 | Pavlov et al. ................. | 235/380 |
| 4,876,441 A | | 10/1989 | Hara et al. ................... | 235/488 |
| 4,931,138 A | * | 6/1990 | Hashinmoto ............. | 156/659.1 |
| 5,276,311 A | | 1/1994 | Hennige ...................... | 235/380 |
| 5,789,732 A | | 8/1998 | McMahon et al. ........... | 235/485 |
| 6,110,864 A | * | 8/2000 | Lu .............................. | 283/94 |
| 6,128,840 A | * | 10/2000 | Boisvert ................ | 40/124.191 |
| 6,161,761 A | * | 12/2000 | Ghaem et al. .............. | 235/492 |

FOREIGN PATENT DOCUMENTS

| | | | |
|---|---|---|---|
| DE | 19609732 A1 | 9/1997 | |
| DE | 19631557 A1 | 2/1998 | |
| EP | 0583006 | * 2/1994 | ................. 235/492 |
| EP | 0825546 A3 | 2/1998 | |
| EP | 0825546 A2 | 2/1998 | |
| GB | 1004329 | 9/1965 | |
| GB | 2255934 | 11/1992 | |
| WO | WO 90/13148 | 11/1990 | |
| WO | WO 98/16911 | 4/1998 | |

* cited by examiner

*Primary Examiner*—Michael G. Lee
*Assistant Examiner*—Daniel St. Cyr
(74) *Attorney, Agent, or Firm*—Alix, Yale & Ristas, LLP

(57) ABSTRACT

A portable card of suitable dimensions to fit into a wallet or purse which incorporates a micro-processor, connecting means for connecting the microprocessor with another device and a display means controlled by the microprocessor wherein the display means is capable of displaying text and/or images.

4 Claims, 1 Drawing Sheet

PORTABLE CARDS

CROSS-REFERENCE TO RELATED APPLICATION

This is a continuation of International Application No. PCT/GB98/03145 filed Oct. 22, 1998.

FIELD OF THE INVENTION

The present invention relates to portable cards of suitable dimensions to fit into a wallet or purse which carry a micro-processor.

BACKGROUND ART

Prior art methods of gaining access to the information stored on a portable card such as an identity card, payment card, credit card etc. require the use of a suitable card reader.

For conventional credit cards (charge, debit and other types of payment cards), a magnetic strip is encoded with a small amount of coded information specific to the card holder and limited to that which can be used to determine that the card is the rightful property of the person who bears it. To access this information, the card must be passed or swiped over a reading head. No other data is stored on the card, and all further transaction-related information is stored in and accessed by the card reader from a remote database. Conventionally, transaction information is printed out or presented on a display incorporated into the card reading device. Such displays are complex, expensive and often bulky, all factors limiting their wider availability.

The incorporation of data processing means and storage means into the substrate of a credit card sized card (smart card) to carry information specific to that card and or the holder is also known in the art.

Such smart cards are becoming more widely available. The storage means on such cards can be used to carry much more information than a magnetic strip. This information can be sufficiently encrypted to prevent its fraudulent alteration. Thus, in particular the card's memory can be used to hold a monetary value, which may be accessed via an appropriate card reader. The information held in the card's storage means can also be adjusted to take account of new transactions.

The smart card may be used as an electronic purse. Such electronic purses replace the function of cash for small purchases. However, keeping track of the contents (or value) of the electronic purse is not as easy as looking in a real purse. The card owner has to keep a mental note of the 'cash value' remaining on the card, as displayed by the card reader at point of sale after each transaction; even if these transactions separated by days or weeks. Currently, there are no inexpensive means of displaying a card's stored value without expensive card readers with built-in displays or monitors.

The use of Liquid Crystal Displays (LCD) incorporated within the structure of a Credit Card have been described. For example, U.S. Pat. No. 5,276,311 describes the manufacture and use of LCDs to display the function of a multi-use credit card on the card. However, the production of such displays is a complex and expensive process, rendering it inappropriate for use in portable cards as described above except in exotic or specialized areas.

Electroluminescent devices are known in the art. For example, WO-A-90/13148 discloses an active light emitting polymer (LEP) layer sandwiched between conductive layers. Other known electroluminescent devices include phosphor-electroluminescent devices, fractoluminescent devices, chemoluminescent devices, sonoluminescent devices, bioluminescent devices etc.

The aim of the present invention is to provide a data-carrying portable card wherein the data being carried by the card may be accessed without use of a card-reading machine.

Another subsidiary aim of the present invention is to provide a card with a high-resolution display which is inexpensive enough to produce so as to allow mass production of such cards.

SUMMARY OF THE INVENTION

This invention concerns a portable card of suitable dimensions to fit into a wallet or purse which incorporates a micro-processor, connecting means for connecting the microprocessor with another device and a display means controlled by the microprocessor wherein the display means is capable of displaying text and/or images.

Such a portable card allows the display of text and/or images on the card itself thus allowing data to be accessed without the use of a card-reading machine and reducing the frequency with which a card-user must go to and use a card-reading apparatus.

Advantageously, a volume printing process, for example offset lithographic printing, may be used to lay down a very thin layer of electroluminescent material along with other functional layers, within the fabric of the portable card, in a predetermined pattern, so as to form an addressable display area.

Further objectives and advantages of the invention will become apparent from a consideration of the drawings and the ensuing description.

DETAILED DESCRIPTION OF THE INVENTION

Figure 1:
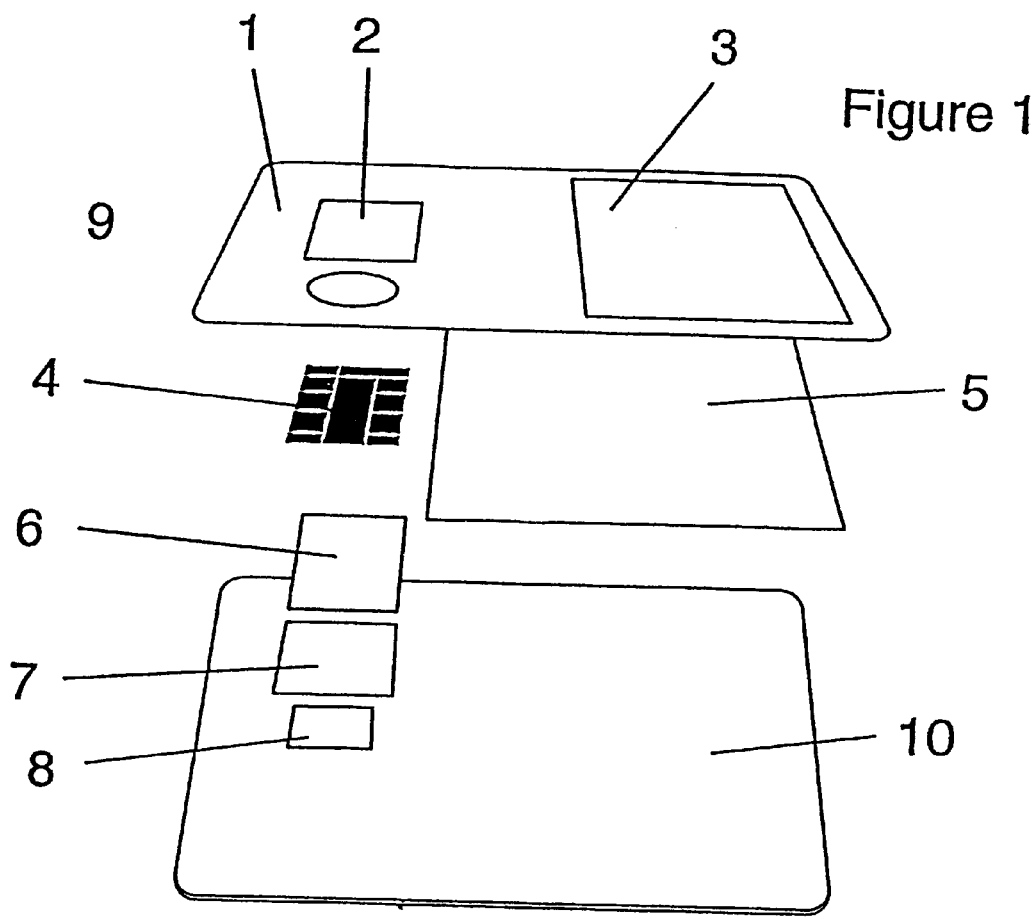
FIG. 1 is a schematic exploded diagram of an embodiment of the invention.
Figure 2:
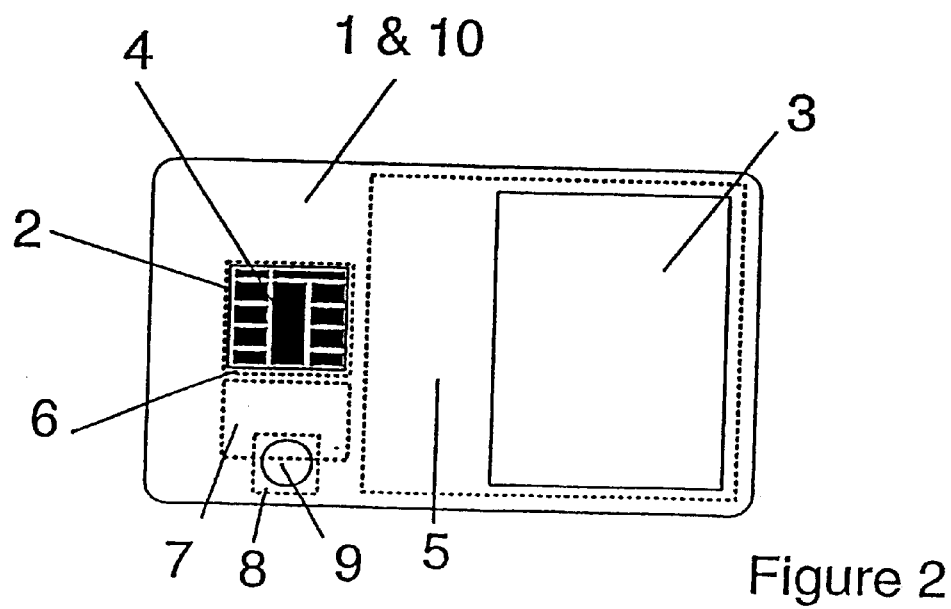
FIG. 2 is a schematic drawing of an embodiment according to the invention.

One embodiment of the invention consists of a plastic laminated structure comprising a number of components encapsulated between base layer or substrate 10 and a protective covering 1.

The protective covering 1 is made of a flexible material and has a hole cut from it 2 to reveal metal contacts 4 which allow peripheral devices (card readers etc.) to access information held within the on-board microprocessor 6 via contacting electrodes. The protective covering 1 is transparent and is printed with a design over most of its underside save in one area where the electroluminescent material is printed to form the display 3. The material is printed on the underside of the protective covering 1, which protects it from environmental attack and mechanical abrasion, either of which would otherwise adversely affect its performance.

A second microprocessor 7 dedicated to driving the display 3 is laminated into the structure and linked to the primary microprocessor 6 and the external contacts 4 as is necessary for the card to function.

The protective covering 1 also carries a button area 9 positioned, for example, above a device sensitive to changes in capacitance 8. This area is used as an input device and the numbers of such areas on the surface of the card may be increased if, as and when circumstances require it.

The display 3 and associated circuitry is powered by a thin film battery 5 printed down onto the supporting substrate 10 of the card and connected to the display 3, its controlling processor 7, the button area 9 and any other internal hardware necessary for control and illumination of the display 3 via conducting inks which are printed down on top of the various elements to facilitate such connection. The whole card is bonded together using heat and pressure so as to render it as one integral piece, thereby removing the possibility of disassembly or repair.

The electroluminescent material and associated functional layers are laid down in such a way as to create a small addressable display area upon the surface of the portable card, within the standard card thickness.

Controlled by the card's micro-processor, and powered by the rechargeable battery, the display area may be used to display information about the contents of the card, instructions to direct the bearer in the completion of a transaction or when 'charging' monetary value of the card, or to display other special message information transmitted into the card by the card reader for later display when appropriate.

Such a display incorporated within the smart card itself enables the bearer to check on the contents of the card at any time, without the need for an expensive reader. A luminescent display has the further advantage of enabling the user to read it in light or dark conditions.

Such a device also enables the card to display directions instructing the holder in completion of transactions to charge the cash value of the card, without the need for a larger external display monitor. In this way drawing cash out of a bank account would no longer require an automatic teller machine (ATM). Instead, a simple card reader/port could be incorporated into a range of telecommunications devices, private or public telephones, mobile telephones or internet connected computers for example.

In each case, insertion of the card would initiate a dialing sequence to connect the telephone to the relevant financial institution. As the connection was made, the display on the card would instruct the holder to complete the transaction using a series of prompts shown on the smart card's own integral display, First, the holder would be directed to enter a Personal Identification Number (PIN) via the key pad, to verify ownership of the card. The functions of a normal ATM could then be executed easily. A cash withdrawal (charging up the card), the transfer of funds, crediting accounts from the value in the card, will all be possible using the key pad of the telephone, following instructions displayed on the screen incorporated in the card.

A particular advantage of the embodiments of the invention which involve the use of a volume printing method in laying down electroluminescent materials to form the display is the low cost of producing the additional functional elements required to create such a display. However, the use of more expensive methods may be appropriate for certain types of usage.

The card itself may also carry a number of switches incorporated within the fabric of the card. Pressing in the appropriate area enables the card holder to check on the balance held within the card, at any time.

We claim:

1. A manufacturing method for manufacturing a portable card of suitable dimensions to fit into a wallet or purse and laminar in structure which portable card comprises the following elements:

a base substrate;

a micro-processor;

a power source;

connecting means for connecting the microprocessor with a data-processing device;

an electroluminescent display means controlled by the microprocessor;

a flexible transparent protective covering layer;

which manufacturing method comprises the steps of:

a display forming step, in which electroluminescent material is printed onto one side of the flexible transparent protective covering layer;

a component placing and circuit creation step, in which the microprocessor, power source and connecting means are disposed on the base substrate and conducting inks are printed thereon to facilitate connections between them; and a bonding step, in which the elements of the portable card are bonded together using heat and pressure so as to render the card as one integral piece.

2. A manufacturing method according to claim 1 wherein the electroluminescent material comprises a light emitting polymer.

3. A manufacturing method according to claim 2 wherein the light emitting polymer is a conjugated polymer.

4. A manufacturing method according to claim 1 wherein the electroluminescent material comprises phosphor electroluminescent material.

\* \* \* \* \*